United States Patent
Ono et al.

(10) Patent No.: US 6,643,231 B2
(45) Date of Patent: *Nov. 4, 2003

(54) OPTICAL DISC APPARATUS AND METHOD

(75) Inventors: Kazuhiko Ono, Yokohama (JP); Eiji Ikeda, Yokohama (JP); Hiroshi Minoda, Yokohama (JP); Akio Fukushima, Yokohama (JP); Hiroaki Shioyama, Yokohama (JP); Shigeki Inoue, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/197,872

(22) Filed: Jul. 19, 2002

(65) Prior Publication Data

US 2002/0181345 A1 Dec. 5, 2002

Related U.S. Application Data

(63) Continuation of application No. 10/121,863, filed on Apr. 15, 2002, now Pat. No. 6,552,970, which is a continuation of application No. 09/972,999, filed on Oct. 10, 2001, now Pat. No. 6,452,889, which is a continuation of application No. 09/394,601, filed on Sep. 13, 1999, now Pat. No. 6,317,403, which is a continuation of application No. 08/888,469, filed on Jul. 7, 1997, now Pat. No. 6,002,655.

(30) Foreign Application Priority Data

Jul. 10, 1996 (JP) .............................. 8-180910

(51) Int. Cl.$^7$ ................................................ G11B 7/00
(52) U.S. Cl. ..................................... 369/44.28; 369/94
(58) Field of Search ................................. 369/94, 44.28, 369/47.11, 30.1, 30.12, 53.2, 53.29, 44.27, 53.37, 30.15, 30.16, 30.36, 47.55

(56) References Cited

U.S. PATENT DOCUMENTS

| | | | |
|---|---|---|---|
| 4,498,110 A | 2/1985 | Kimura | |
| 4,817,068 A * | 3/1989 | Yamauchi | 369/30.36 |
| 5,255,262 A | 10/1993 | Best et al. | |
| 5,263,011 A | 11/1993 | Maeda et al. | |
| 5,410,530 A | 4/1995 | Best et al. | |
| 5,428,597 A | 6/1995 | Satch et al. | |
| 5,446,723 A | 8/1995 | Best et al. | |
| 5,499,231 A | 3/1996 | Fennema et al. | |
| 5,502,703 A * | 3/1996 | Yamada et al. | 369/47.55 |
| 5,513,155 A * | 4/1996 | Kim et al. | 369/30.15 |
| 5,608,715 A | 3/1997 | Yokogawa et al. | |
| 5,696,743 A | 12/1997 | Kawasaki | |
| 5,793,720 A | 8/1998 | Nichikata | |
| 5,881,032 A | 3/1999 | Ito et al. | |
| 5,920,527 A | 7/1999 | Aoki | |
| 6,108,291 A * | 8/2000 | Ono et al. | 369/47.11 |
| 6,317,403 B1 | 11/2001 | Ono et al. | 369/44.27 |

FOREIGN PATENT DOCUMENTS

| | | |
|---|---|---|
| EP | 0 715 301 A2 | 6/1996 |
| EP | 0 717 401 A1 | 6/1996 |
| JP | 58-64643 | 4/1983 |
| JP | 63-225976 | 9/1988 |
| JP | 5-54396 | 3/1993 |
| JP | 06-236555 | 8/1994 |
| JP | 8-147762 | 6/1996 |
| JP | 9-138950 | 5/1997 |
| JP | 10-11766 | 1/1998 |
| WO | 96 19807 | 6/1996 |

\* cited by examiner

*Primary Examiner*—Thang V. Tran
(74) *Attorney, Agent, or Firm*—Antonelli, Terry, Stout & Kraus, LLP

(57) ABSTRACT

A method and apparatus for reproducing data from an optical disc which has a plurality of recording layers reproducible from one side of the optical disc, and in which the disc is recorded in the OTP (Opposite Track Path) type. Upon receipt of a command of pausing, a pausing operation is performed by switching a moving direction of a focal point of an optical pickup in accordance with layer information of the recording layer to be currently reproduced.

6 Claims, 7 Drawing Sheets

STRUCTURE OF A DVD DUAL-LAYER DISC

OBJECT LENS 12

PHYSICAL SECTOR LAYOUT OF DVD DUAL-LAYER DISC AND ADDRESS INFORMATION CONSTRUCTION

PHYSICAL SECTOR LAYOUT OF DVD DUAL-LAYER DISC AND ADDRESS INFORMATION CONSTRUCTION

CONVENTIONAL PAUSING OPERATION

PRIOR ART

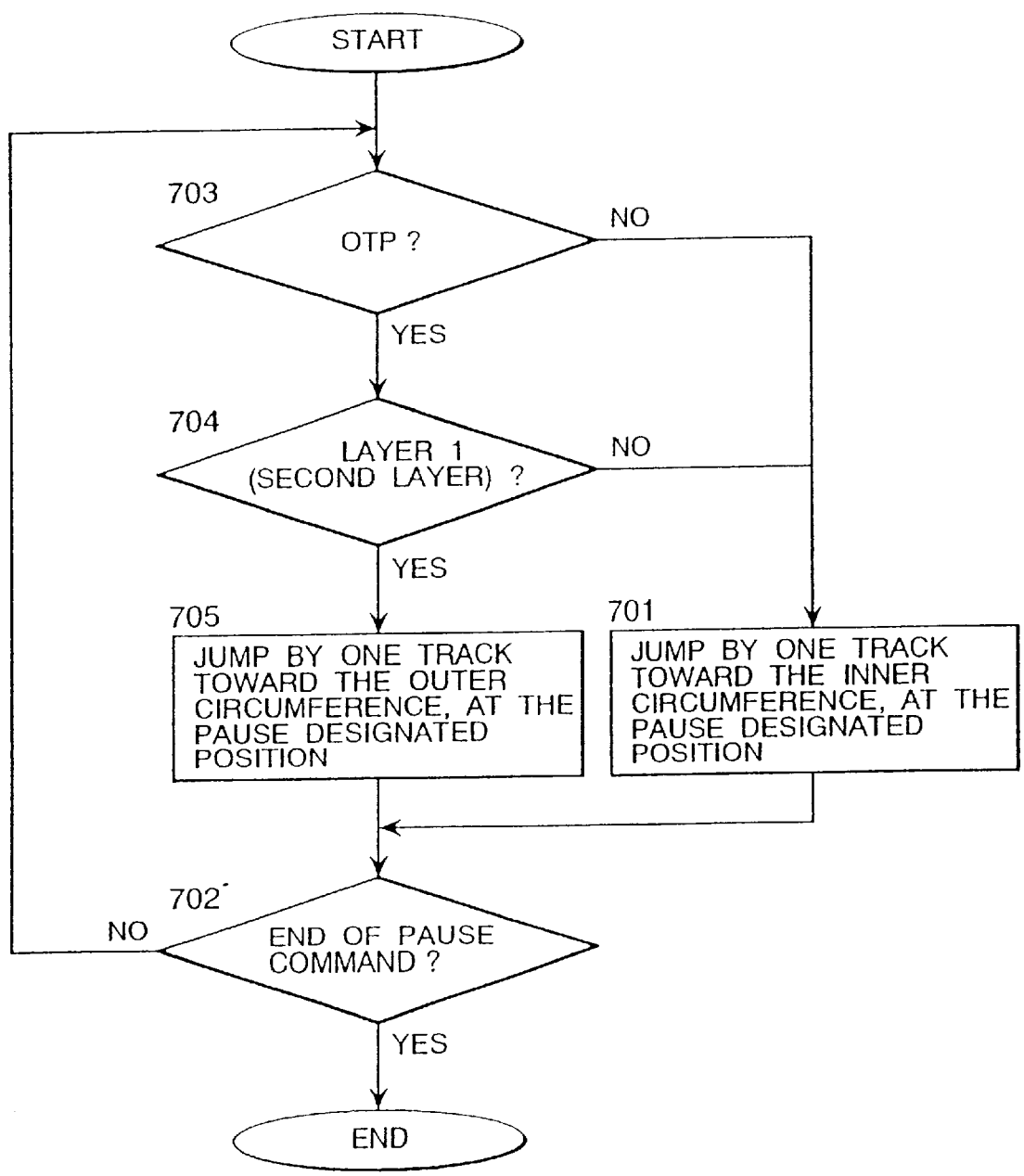

OPTICAL DISC APPARATUS AND METHOD

CROSS REFERENCE TO RELATED APPLICATIONS

This is a continuation of U.S. application Ser. No. 10/121,863, filed Apr. 15, 2002, now U.S. Pat. No. 6,552,970, which is a continuation of U.S. application Ser. No. 09/972,999, filed Oct. 10, 2001, now U.S. Pat. No. 6,452,889, which is a continuation of U.S. application Ser. No. 09/394,601, filed Sep. 13, 1999, now U.S. Pat. No. 6,317,403, which is a continuation of U.S. application Ser. No. 08/888,469, filed Jul. 7, 1997, now U.S. Pat. No. 6,002,655, the subject matter of the aforementioned application be incorporated by reference herein, and relates to copending application U.S. application Ser. No. 09/394,600, filed Sep. 13, 1999, now U.S. Pat. No. 6,108,291, the subject matter of which is incorporated by reference herein.

BACKGROUND OF THE INVENTION

1. Field of the Invention

The present invention relates to an optical disc apparatus accessing method and system therefor capable of reproducing an optical disc on one surface of which are provided plural layers of information recording surfaces.

2. Description of the Prior Art

In the optical disc as a recording medium, laser discs (LD) have been extensively popularized as media in which plural layers of information recording surfaces are provided. In these recording media, each layer of information recording surface is present on both surfaces of the media in terms of physical construction. Therefore, in the case where information recording layers to be reproduced need be switched, it is general that the disc is inverted or changed.

With the recent trend of larger capacity of data for a computer and practical use of recording and reproducing of digital moving picture information, it has been demanded to make the optical disc higher recording density. The specification of a large capacity optical disc such as DVD (Digital Versatile Disc) has been proposed, and an optical disc such as a dual-layer disc has been standardized in addition to a conventional information recording of a one-side single layer. Since these optical discs have a dual-layer information recording layer on one side, there is necessary a reproducing method different from the conventional reproduction of single layer disc depending 6n switching of an information recording layer to be reproduced, and the form of information recorded and how to use it. One method is an accessing method and the other is a pausing (temporary stop) method.

In the optical disc, in the case where an optical pickup is accessed to a recording position of read target information of the same information recording layer in order to realize the high speed access, normally, present position information recorded in the disc is first read to obtain the present position of the optical pickup. Then, a target position is obtained from a logic or physical address of read target information. These two positions are converted from an information recording format of the disc into physical position information, the distance on a disc plane between the two points is obtained, and the optical pickup is accessed to the target position by means for controlling a slider on which the optical pickup is loaded.

However, in the case of the optical disc having a plurality of information recording layers on one side, there is taken the procedure such that in the case where read target information is present on the other information recording layer, the track positions between the information recording layers are not always coincided, and the optical pickup is moved to the target position on the basis of position information of the information recording layer now being reproduced, after which the optical pickup is moved to the target information recording layer. This procedure has a problem in that accessing cannot be made to the target position at high speeds and accurately.

In addition, the one-side dual-layer disc of DVD includes two kinds, one being a parallel track path (hereinafter referred to as PTP) in which the recording path of the first layer is the same as that of the second layer as shown in FIG. 3(1), and the other being an opposite track path (hereinafter referred to as OTP) in which the recording path of the first layer is reversed to that of the second layer as shown in FIG. 3(2). In case of the OTP, the physical address of the second layer is provided without direct relation with that of the first layer, and therefore, accessing to the other information layer is impossible on the basis of the position information of the information recording layer now being reproduced.

Also, with respect to the pausing (temporary stop) operation, there is a problem in that the pausing is not obtained in the second layer of the disc of OTP in the state of the operation of the conventional reproduction of one-side single disc.

SUMMARY OF THE INVENTION

It is an object of the present invention to provide, in the reproduction of these discs having a plurality of recording layers, a method for carrying out an access control of an optical pickup accurately, at high speeds and easily, a method for carrying out a pausing operation accurately irrespective of kinds of discs and a system therefor.

For achieving the aforementioned object, according to the present invention, there is provided an accessing method for an optical disc apparatus for recording/reproducing an optical disc on one side of which are provided plural layers of information recording surfaces and system therefor, the method comprising:

recording/reproducing information on at least one information recording layer among the plural layers of information recording layers, and switching the information recording layer for information to be recorded/reproduced during the information recording/reproducing.

According to the present invention, there is provided a method for reproducing data from an optical disc which has a plurality of recording layers reproducible from one side of the optical disc, and in which the optical disc is recorded in the OTP (Opposite Track Path) type. Upon receipt of a command of pausing, a pausing operation is performed by switching a moving direction of a local point of an optical pickup in accordance with layer information of the recording layer to be currently reproduced.

More specifically, according to the present invention, in starting the access control of an optical pickup over a plurality of recording layers, first, a beam focal point of the optical pickup is moved by using a moving means to a recording layer in which target information is recorded to switch information recording layers during reproduction, and after this, the distance on a disc plane between two points is obtained from a present position of the optical pickup on the information recording layer after movement and a target position of read information, using a control processing means similar to the access between the same recording layers to perform the access control of the optical pickup. Further, according to the present invention, with respect to the pausing operation, whether or not a disc during reproduction is one-side dual-disc is stored in advance by an optical disc reproducing apparatus, and when instructions for pausing operation are given at the time of reproduction of the second layer of the OTP disc, the track jump direction of the pickup is reversed to that of the first layer.

The foregoing and other objects, advantages, manner of operation and novel features of the present invention will be understood from the following detailed description when read in connection with the accompanying drawings.

BRIEF DESCRIPTION OF THE DRAWINGS

FIG. 7 is a flowchart showing the flow of conventional pausing operation.

DETAILED DESCRIPTION OF THE PREFERRED EMBODIMENTS

Figure 1:
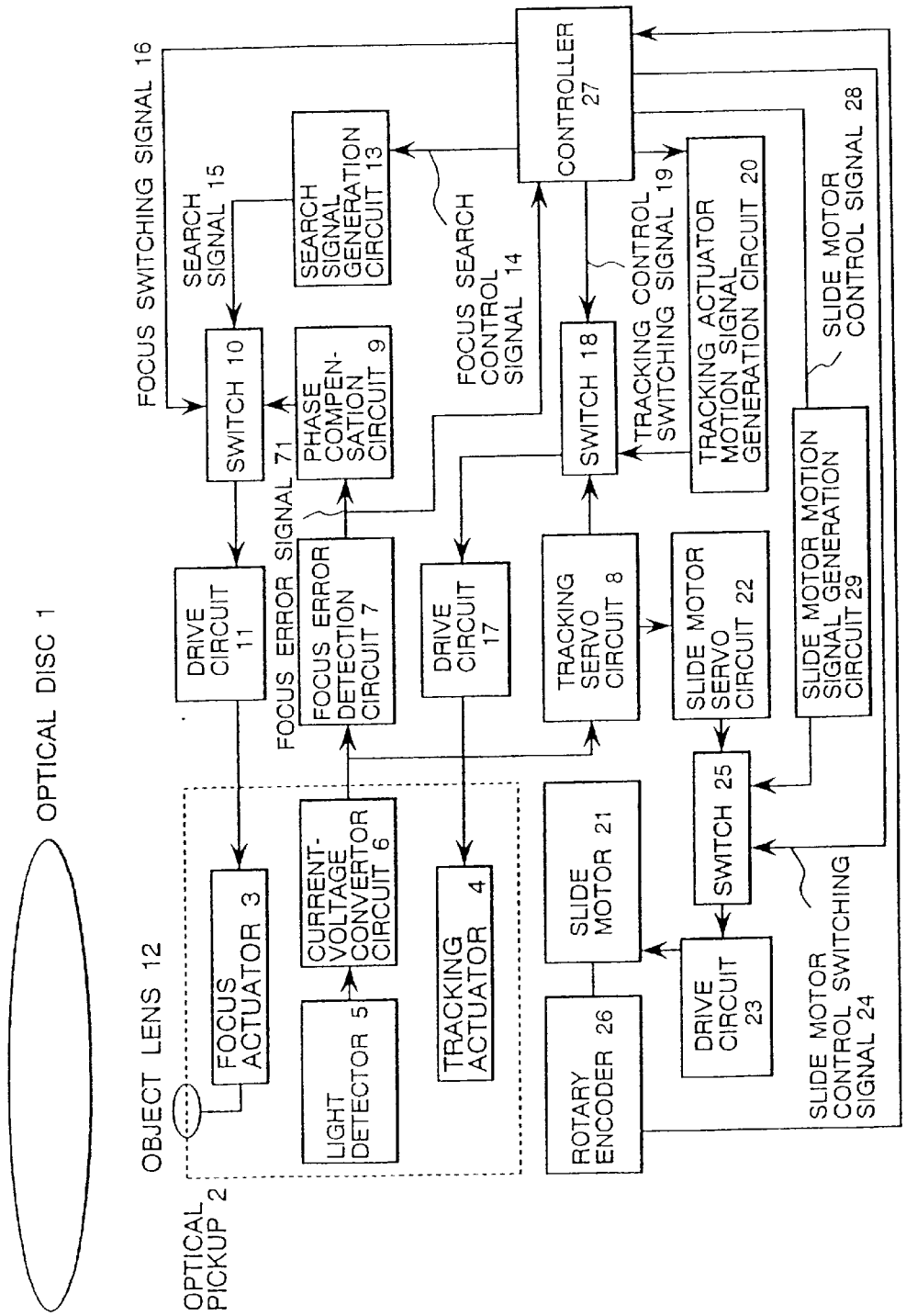
FIG. 1 is a block diagram of an optical disc apparatus forming the constitutional requirement of the present invention according to a first embodiment of the present invention.

The present invention will be explained hereinafter with reference to one embodiment shown in the drawings.

FIG. 1 is a block diagram of an optical disc apparatus forming the constitutional requirement of the present invention according to a first embodiment of the present invention. The present optical disc reproducing apparatus is composed of, other than those shown here, a decoder block for reproducing, demodulating, error-correcting signals for decoding reproduced data, a system control block for controlling the entire optical disc apparatus, an interface block for the interface with external information processing equipment, an encoder block for modulation and error-correction for recording data, etc. The blocks not directly relating to the present invention out of the above-described blocks will be omitted in their explanation and drawings.

First, the functions of the blocks shown will be roughly explained below.

An optical disc 1 is an optically readable information storage medium such as a compact disc (CD), a digital versatile disc (DVD), etc. Information is recorded in a signal recording surface at a concave portion called a pit.

An optical pickup 2 is to reproduce information from the optical disc 1 and comprises a semiconductor laser is not shown, a focus actuator 3, a tracking and optical part actuator 4, and a light detector 5. Light departed from the semiconductor laser is focused at a signal recording surface of the optical disc 1 to form an optical spot. Since the quantity of light reflected from the optical spot changes due to the presence or absence of pit, the change of the quantity of light can be detected as a signal to reproduce the signal.

The light detector 5 is to convert the change in the quantity of light reflected from the optical disc 1 into a current signal. An output of the light detector 5 is converted into a voltage signal by a current-voltage converter circuit 6, which voltage signal is transmitted to a focus error detection circuit 7 and a tracking servo circuit 8. A focus error signal 71 detected by the focus error detection circuit 7 is applied to the focus actuator 3 via a phase compensation circuit 9, a switch 10 and a drive circuit 11 to form a focus servo loop for controlling an objective lens 12 in a focusing direction.

A search signal generation circuit 13 is a circuit for generating a search signal 15 according to a focus search control signal 14. The search signal 15 is transmitted to the drive circuit 11 and applied to the focus generator 3 whereby the objective lens 12 can be moved in the focusing direction separately from the focus servo loop.

The switch 10 is switched according to the state of a focus switching signal 16 to switch the switch 10 so that an output of the phase compensation circuit 9 is transmitted to the drive circuit 11 whereby the operation of the focus servo loop can start.

The tracking servo circuit 8 comprises a tracking error-detection circuit, a phase compensation circuit and the like, and an output signal is applied to the tracking actuator 4 via a drive circuit 17 to form a tracking servo loop for controlling the objective lens 12 in a tracking direction.

In the switch 18, the tracking servo loop is opened by a tracking control switching signal 19, and the objective lens 12 can be moved in the tracking direction by an output signal of a tracking actuator motion signal generation circuit 20.

A slide motor 21 is to move the optical pickup 2. Normally, an output signal of the tracking servo circuit 8 is transmitted to a drive circuit 23 via a slide motor servo circuit 22 to form a slide motor servo loop. In the case where the optical pickup is moved for the access operation or the like, a switch 25 is switched by a slide motor control switching signal 24, and a controller 27 outputs a slide motor control signal 28 to a slide motor motion signal generation circuit 29 according to speed and position information obtained by an output signal of a rotary encoder 26 to drive a slide motor 21 via the drive circuit 23.

Next, one example of an optical disc on one side of which are provided two layers of information recording layers will be explained. The present optical disc apparatus reproduces CD, DVD single layer, and DVD dual layer discs. The dual disc of DVD will be explained below as an example.

Figure 2:
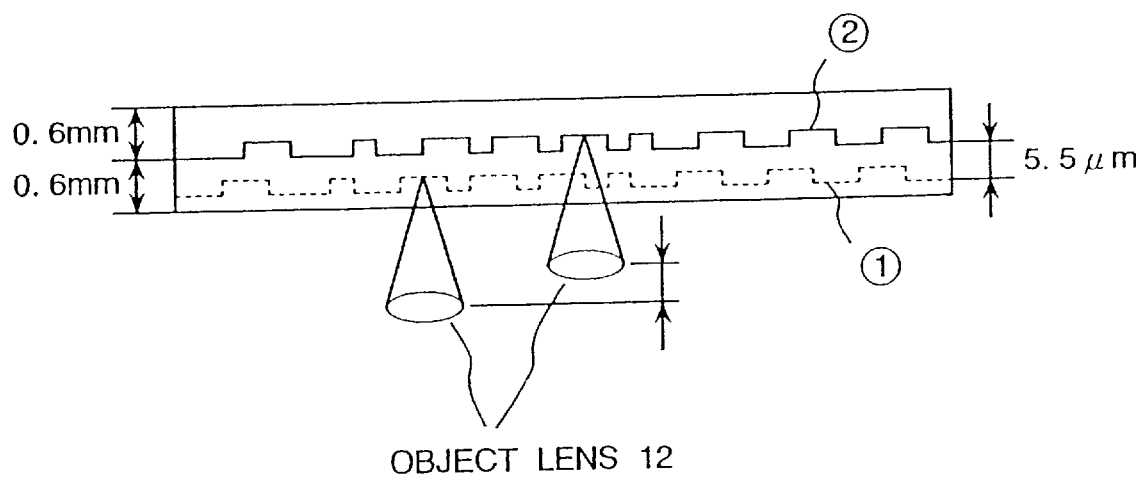
FIG. 2 is view schematically showing the construction of a DVD dual-layer disc used in the present embodiment.

FIG. 2 shows the construction of a DVD dual-layer disc.

The DVD dual-layer disc bas two information recording layers arranged on one side of the disc at intervals of approximately 55 μm thickness-wise of the disc. These information recording layers are normally formed separately and mechanically pasted together.

In FIG. 2, a first layer ① is a translucent recording film, and a second layer ② is a reflecting film formed of aluminum vapor deposition or the like. The reproduction of the dual-layer disc is carried out, as shown in FIG. 2, by irradiating a laser beam from the first layer □ side and having the objective lens 12 in the direction at right angles to the disc to form a focal point to the first layer ① and the second layer ②.

Figure 3A:
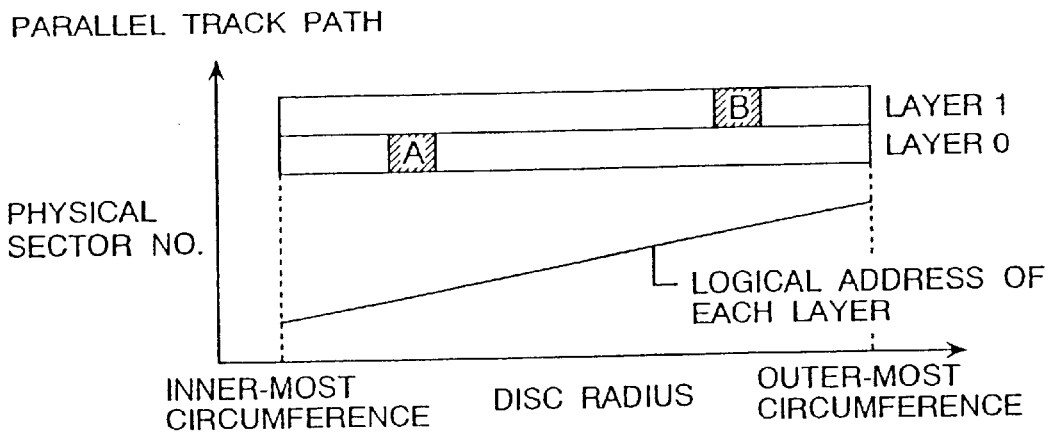
FIGS. 3(a) and 3(b) are respectively views schematically showing a physical sector layout of DVD dual-layer disc and address information construction in the present embodiment.
Figure 3B:
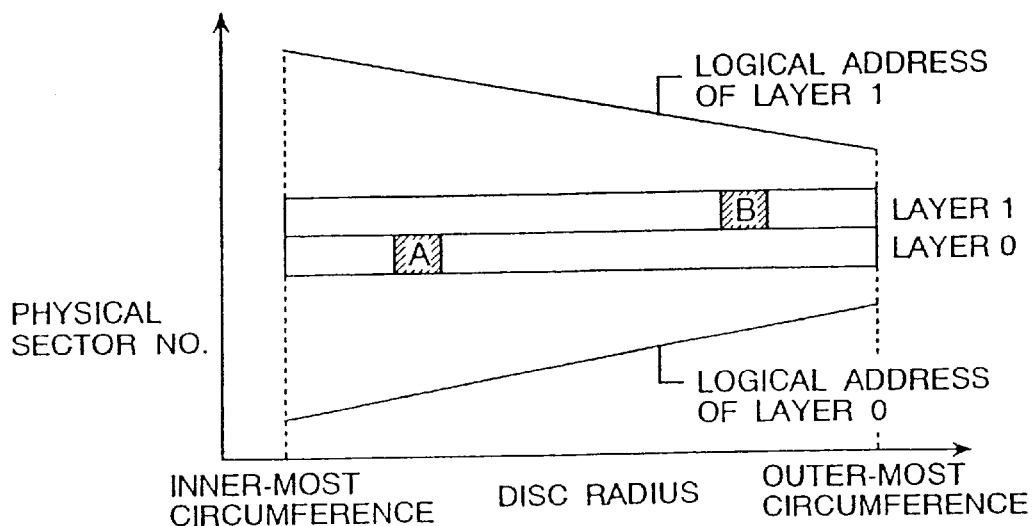

FIGS. 3(a) and 3(b) are respectively views schematically showing a physical sector layout of DVD dual-player disc and address information construction.

FIG. 3(a) shows a parallel track path (PTP). A physical sector of the same address, which is not related to address information and incremented from the inner circumference to the outer circumference of the disc, is present in each information recording layer between a physical sector on the layer 0 (first layer) and a physical sector on the layer 1 (second layer).

FIG. 3(b) shows an opposite track path (OTP). Address information of a start physical sector on the layer 1 (second layer) is represented by address information whose each bit being inverted of address information of a final physical sector on the layer 0 (first layer), and the address information of the layer 1 (second layer) is incremented from the outer circumference to the inner circumference of the disc and recorded. That is, the address information of the layer 0 (first layer) is incremented from the inner circumference to the outer circumference of the disc whereas the address information of the layer 1 (second layer) is incremented from the outer circumference to the inner circumference of the disc.

In the DVD disc, information of one side single-layer disc, one side dual-layer disc, disc of PTP or disc of OTP is recorded as index information of disc in a control data area of the disc, and information of the layer 0 (first layer) of the layer 1 (second layer) is recorded in the sector address.

Accordingly, in the optical disc reproducing apparatus, it is possible to know what disc is contained by reading the index information, and it is possible to carry out the special reproduction conveniently by storing whether the disc being reproduced is the disc of PTP or the disc of OTP in the optical disc reproducing apparatus.

In what disc of PTP shown in FIG. 3(a) and of OTP shown in FIG. 3(b), in the case where accessing between and over information recording layers so that the optical pickup is moved from the physical sector A present on the layer 0 (first layer) to the physical sector B present on the layer 1 (second layer), the movement of the optical pickup in a direction of thickness of the disc for switching the information recording layer in which the optical-spot forms a focal point is necessary in addition to the movement of the optical pickup in a radial direction of the disc in the prior art.

The procedure for switching an information recording layer to be reproduced in the present optical disc apparatus will be explained below. In the ensuing procedure, an example will be explained in which the processing of CPU which functions as a system controller is accomplished by soft-ware.

Figure 4:
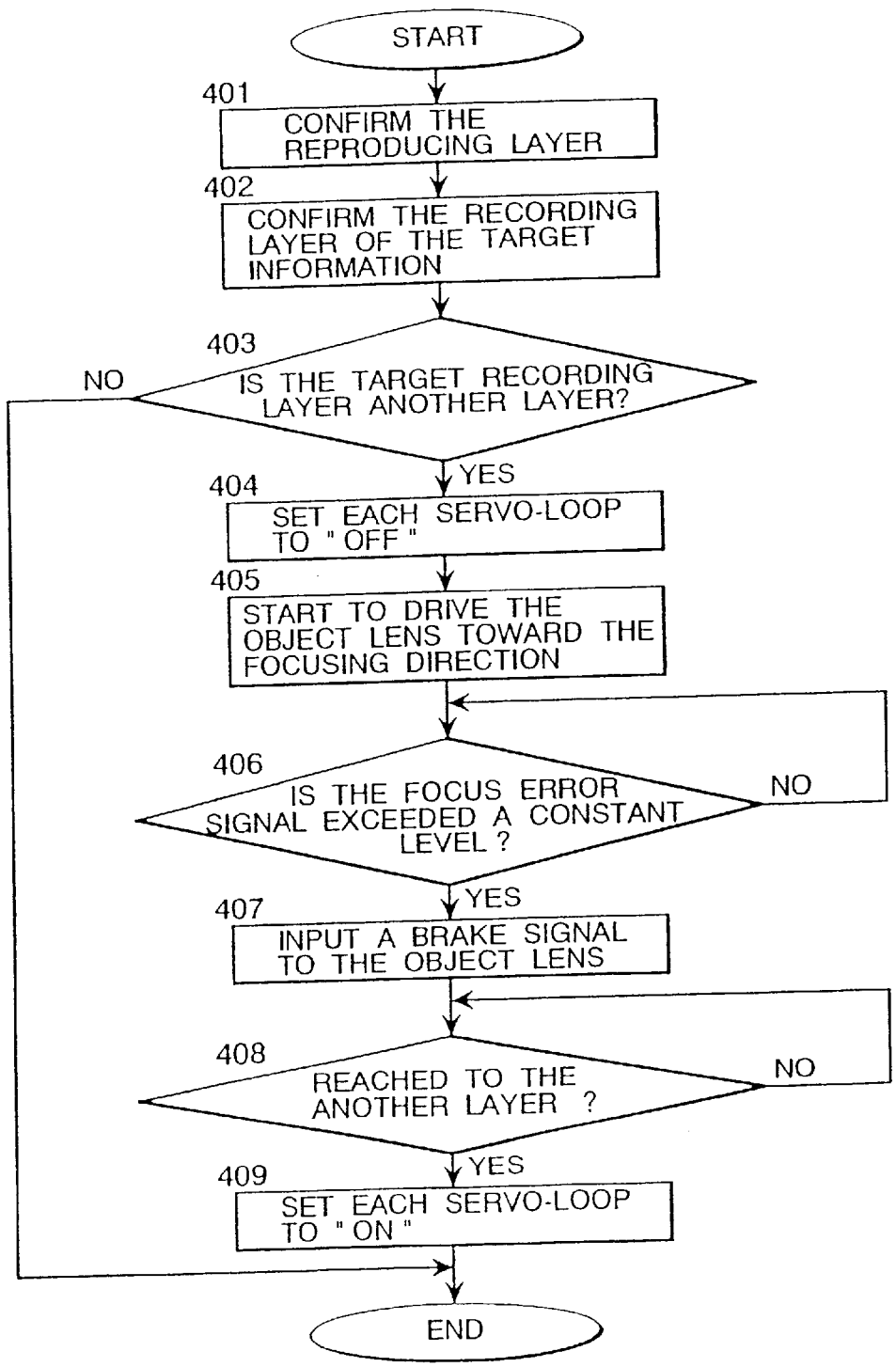
FIG. 4 is a flowchart showing the flow of a switching process of reproducing information recording layer in one embodiment of the present invention.

FIG. 4 is a flowchart showing the flow of a switching process of reproducing information recording layer.

In 401, confirmation is made by information in the sector address whether or not the information recording layer being now reproduced while the objective lens of the optical pickup forms a focal point is the first layer or the second layer. In 402, confirmation is made of the recording layer of the target information.

As a result of the processing in 401 and 402, if judgment is made that the target recording layer is another layer, the servo loop such as the focus servo, tracking servo, etc. for maintaining a focal point of the optical spot in an intended position of the information recording layer of the disc is set to off, in 404.

After this, in 405, a focus search control signal for driving the objective lens toward the focusing direction of the target information recording layer starts to be delivered. As a result, a focus error signal starts to be output as the focal point of the optical spot gradually moves close to the adjacent information recording layer.

In 406, the focus search control signal is continued to deliver till exceeding a preset judging level while monitoring the focus error signal.

After exceeding the judging level, in 407, a signal reverse in phase to the drive signal applied in 405 is output to the focus search control signal for the drawing stabilization of the thereafter focus servo loop to apply a brake to the focus actuator.

In 408, the zero cross point of the focus error signal is detected to thereby judge to be reached to the adjacent information recording layer.

Thereafter, in 409, the switch is switched to set the focus servo loop to on, and to set other servo loops to on sequentially.

Now, in the optical disc in which two information recording layers are actually provided on one side, accessing over the information recording layers will be explained.

Generally, in the optical discs such as CD and DVD, the procedure is employed in which the logical present position and target position at the start of accessing are converted into the physical position on the disc, the difference thereof is obtained to calculate the distance on the disc plane between relative two points, and the optical pickup is moved to the target position at high speeds without reading the position information recorded in the moving disc using control means for the slider on which the optical pickup is loaded.

One example of the method for converting the present position and the target position into the physical position will be explained. Let $R0$ (m) be the radius from the center of the disc of the sector number $S0$ as a reference on the disc, CLV (m/s) be the linear speed when the information of disc is recorded, TP (m) be the track pitch, and $T0$ be the time required to reproduce 1 sector. Then, the relation with the radius $R1$ (m) from the disc center of the sector number $S1$ present on the same information recording layer can be expressed by $$R1^2 = (CLV \cdot TP \cdot T0(S1-S0)/\pi) + R0^2$$

In the case of the dual-disc, the information recording layers are different in the linear speed and the track pitch in terms of forming the disc, it is therefore necessary to use the above-described formula every information recording layer in which sector is recorded.

In the case where accessing is carried out over the information recording layers, in the disc of PTP, the physical sector is provided from the inner circumference to the outer circumference of the disc in both the layer 0 (first layer) and the layer 1 (second layer). So, there is a method comprising: moving the target distance on the basis of the information of the information recording layer now being reproduced, approaching to the target sector while reading the present position information recorded in the information recording layer being reproduced, and after this, accessing to the target sector over the information recording layers. However, since the layer 0 and the layer 1 are not always coincided in the track pitch and the linear speed, the wasteful access time to the final target sector occurs.

Further, in the disc of OTP, the layer 0 is totally different in the physical sector from that of the layer 1, and it is impossible to access to the target sector of the other information recording layers on the basis of the information of the information recording layer now being reproduced.

In the present embodiment, the aforementioned problems are solved by the following processing.

Figure 5:
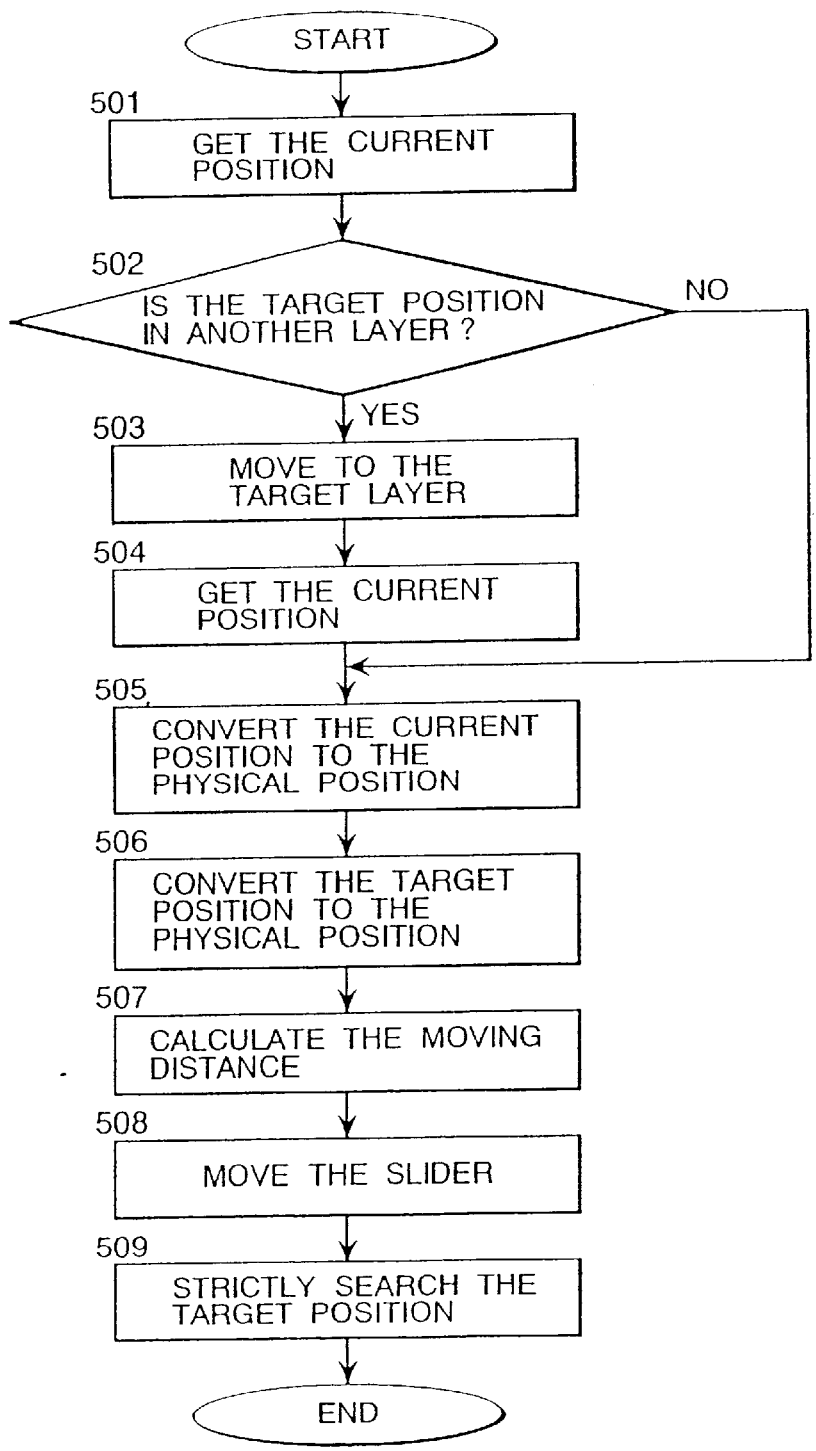
FIG. 5 is a flowchart showing the flow of an access controlling process of an optical pickup in one embodiment of the present invention.

FIG. 5 is a flowchart showing the flow of an access controlling process of an optical pickup according to the present invention.

In the present embodiment, first, in 501, confirmation is made of the position of the optical pickup by reading the present position information recorded in the optical disc.

Then, in 502, judgment is made whether or not the recording position of the target information subjected to accessing is the same as the present information recording layer.

When the information recording layer is not the same, in 503, the beam focal point of the optical pickup is moved to the target information recording layer by the focus moving means previously explained with reference to FIG. 4.

After movement, in 504, confirmation is made of the present position of the optical pickup on the information recording layer after movement by the processing similar to that of 501.

In 505 and 506, the present position and the target position are converted to the physical position on the disc.

In 507, the distance on the disc plane between the relative two points is calculated from the physical positions of the present position and the target position obtained by the above described methods. In 508, the optical pickup is moved to the target position at high speeds, without reading the position information recorded in the moving disc, using the control means of the slider on which the optical pickup is loaded.

After movement, in 509, the optical pickup is accessed to the target information recording position while confirming the position information recorded in the disc.

In the above-described series of processings, also in the case of accessing over the information recording layers, accessing is carried out merely adding the processings of 502, 503 and 504, so that the processing means similar to the conventional accessing processing in the same information recording layer after 505 can be used, thus enabling the high speed accessing and enabling processing easily.

Figure 6:
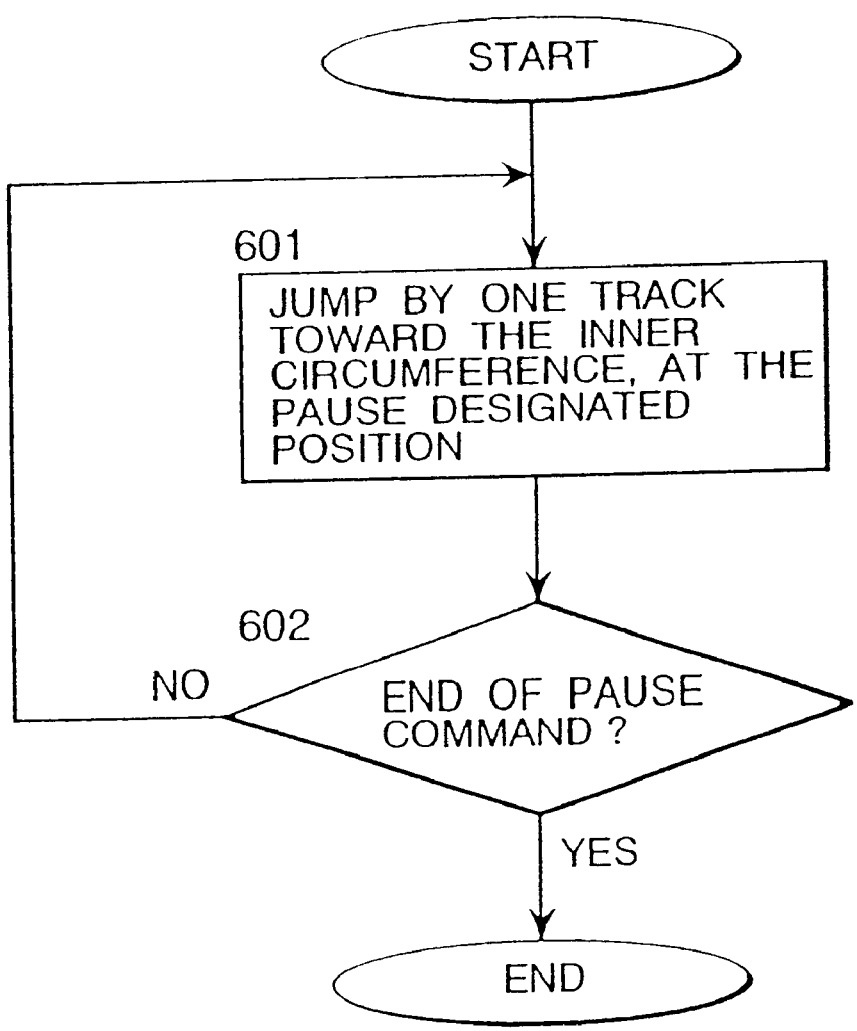
FIG. 6 is a flowchart showing the flow of conventional pausing operation.

The pausing operation according to the present invention will be explained hereinafter with reference to FIGS. 6 and 7. FIG. 6 is a flowchart of the pausing operation heretofore used in CD and LD. FIG. 7 is a flowchart of the pausing operation according to the present invention. In both CD and LD, information is recorded along the spiral signal track from the inner circumference to the outer circumference of the disc. In FIG. 6, upon command of the pausing operation, in 601, "Jump by one track toward the inner circumference, at the pause designated position." whereby the pausing is realized. In 602, this operation is repeated till receipt of the end of pause command. Also in the single-layer disc of DVD and the PTP disc, pausing can be realized in FIG. 6. However, in the layer 1 (second layer) of the OTP disc, the FIG. 6 method rapidly progresses, failing to provide the pausing operation.

In FIG. 7, in the optical disc reproducing apparatus, the presence of the OTP disc is read from the index information. Upon receipt of command of pausing operation, first, in 703, "OTP disc?" is checked, and in 704, "Layer 1 (second layer)?" is checked from the sector address being reproduced. Only at the time of the layer 1 (second layer) in the OTP disc, "Jump by one track toward the outer circumference, at the pause designated position" in 705 whereby the pausing operation is realized.

While in the embodiments according to the present invention, a description has been made of the case of the dual-layer disc, it is to be noted that needless to say, the accessing method and the pausing method according to the present invention can be applied to the disc reproducing apparatus having a plurality of information recording layers such as three layers, four layers, etc.

According to the present invention, in the optical disc apparatus having a plurality of information recording surfaced to be reproduced on one side of the optical disc and which is necessary to switch these information recording layers to be reproduced during the operation, even in the case where the recording position of intended information is provided other than the information recording layer now being reproduced, it is possible to carry out the access control of the optical pickup using the control processing means similar to the access between the same recording layers accurately, at high speeds and relatively easily, and further in both PTP disc and OTP disc, the pausing operation can be realized.

What is claimed is:

1. A method for reproducing data from an optical disc which has a plurality of recording layers reproducible from one side of the disc, the optical disc being recorded in the OTP (Opposite Track Path) type, the method comprising the steps of:

upon receipt of a command of pausing, performing a pausing operation by switching a moving direction of a focal point of an optical pickup in accordance with layer information of the recording layer to be currently reproduced.

2. An accessing method for an optical disc apparatus for reproducing information from an optical disc having at least an information recording layer on which address information is recorded as incremented from an outer circumference to an inner circumference of the disc, the method comprising the steps of:

reading a layer information of the information recording layer to be currently reproduced;

receiving a command of pausing from outside;

performing the pausing operation by jumping a focal point of an optical pickup toward the outer circumference of the disc when the layer information indicates that the information recording layer to be currently reproduced is the one on which address information is recorded as incremented from the outer circumference to the inner circumference.

3. A method for reproducing data from an optical disc which has a plurality of layers reproducible from one side of the disc, said method comprising the steps of:

reading index information recorded on the optical disc, the index information including information indicative of whether the optical disc is recorded in PTP (Parallel Track Path) type, or in OTP (Opposite Track Path) type of which a first layer has address information incremented from an inner circumference to an outer circumference of the disc and a second layer has address information incremented from the outer circumference to the inner circumference of the disc;

reading layer information of the recording layer from which data is currently reproduced;

upon receipt of a command of pausing during execution of reproduction, when the optical disc is recorded in the OTP type, judging whether the recording layer from which data is currently reproduced is the second layer based on the layer information; and when the result of the judgment is the second layer, performing the pausing operation by jumping a focal point of an optical pickup by one track toward the outer circumference of the disc.

4. An apparatus for reproducing data from an optical disc which has a plurality of layers reproducible from one side of the disc, the optical disc being recorded in OTP (Opposite Track path) type, the apparatus comprising:

an optical pickup for reading layer information of a recording layer to be currently reproduced;

a controller for judging, upon receipt of a command of pausing, the moving direction of a focal point of the optical pickup based on the layer information; and an actuator for performing a pausing operation by moving the focal point of the optical pickup in the judged moving direction.

5. An apparatus for reproducing data from an optical disc having at least an information recording layer which is a given address information as incremented from an outer circumference to an inner circumference of the disc, comprising:

means for reading layer information of the information recording layer to be currently reproduced;

means for receiving a command of pausing from outside;

means for performing the pausing operation by jumping a focal point of an optical pickup toward the outer circumference of the disc when the layer information indicates that the information recording layer to be currently reproduced is the one on which address information is recorded as incremented from the outer circumference to the inner circumference.

6. An apparatus for reproducing data from an optical disc which has a plurality of layers reproducible from one side of the disc, comprising:

an optical pickup for reading index information recorded on the optical disc, the index information including information indicative of whether the optical disc is recorded in PTP (Parallel Track Path) type, or in OTP (Opposite Track Path) type of which a first layer has address information incremented from an inner circumference to an outer circumference of the disc and a second layer has address information incremented from the outer circumference to the inner circumference of the disc, and for reading the layer information of the recording layer from which data is currently reproduced;

a controller which judges, upon receipt of a command of pausing, whether the recording layer from which data is currently reproduced is the second layer based on the layer information when the optical disc is recorded in the OTP type; and an actuator for controlling the optical pickup so that a focal point of the optical pickup jumps by one track toward the outer circumference of the disc.

* * * * *